United States Patent [19]

Moldoveanu

[11] Patent Number: 5,621,700
[45] Date of Patent: Apr. 15, 1997

[54] METHOD FOR ATTENUATION OF REVERBERATIONS USING A PRESSURE-VELOCITY BOTTOM CABLE

[75] Inventor: Nicolae Moldoveanu, Houston, Tex.

[73] Assignee: Schlumberger Technology Corporation, Geco-Prakla Div., Houston, Tex.

[21] Appl. No.: 650,325

[22] Filed: May 20, 1996

[51] Int. Cl.⁶ .............................. G01V 1/28; G01V 1/38
[52] U.S. Cl. .............................. 367/24; 367/20; 367/22; 367/57; 364/421
[58] Field of Search .............................. 367/20, 22, 24, 367/57; 364/421

[56] References Cited

U.S. PATENT DOCUMENTS

| | | |
|---|---|---|
| 2,757,356 | 7/1956 | Haggerty . |
| 2,992,694 | 7/1961 | Musgrave et al. . |
| 3,943,484 | 3/1976 | Balderson . |
| 4,405,036 | 9/1983 | Wener et al. . |
| 4,486,865 | 12/1984 | Ruehle . |
| 4,516,227 | 5/1985 | Wener et al. . |
| 4,520,467 | 5/1985 | Berni . |
| 4,558,437 | 12/1985 | Meeder et al. . |
| 4,648,080 | 3/1987 | Hargreaves . |
| 4,935,903 | 6/1990 | Sanders et al. . |
| 4,937,793 | 6/1990 | Shuck et al. . |
| 4,958,328 | 9/1990 | Stubblefield . |
| 4,979,150 | 12/1990 | Barr . |
| 4,992,992 | 2/1991 | Dragoset, Jr. . |
| 5,051,961 | 9/1991 | Corrigan et al. . |
| 5,163,028 | 11/1992 | Barr et al. . |
| 5,235,554 | 8/1993 | Barr et al. . |
| 5,253,217 | 10/1993 | Justice et al. . |
| 5,253,223 | 10/1993 | Svenning et al. . |
| 5,365,492 | 11/1994 | Dragoset, Jr. . |
| 5,396,472 | 3/1995 | Paffenholz . |

OTHER PUBLICATIONS

Knapp, "Geophone differencing to attenuate horizontally propagating noise", Geophysics, vol. 51, No. 9, Sep. 1986; pp. 1743–1759.

Monk, "Wavefield separation of twin streamer data", First Break, vol. 8, No. 3, Mar. 1990; pp. 96–104.

Brink, "Marine seismic exploration using vertical receiver arrays: A means for reduction of weather downtime", 49th Meeting of the European Association of Exploration Geophysicists, Jun. 9–12, 1987 Patent Abstracts, pp. 1385–1386.

Moldoveanu et al., "Digiseis–enhanced streamer surveys (DESS) in obstructed area: A case study of the Gulf of Mexico", Expanded Abstracts from the SEG International Exposition 64th Annual Meeting, Oct. 23–28, 1994, Los Angeles, pp. 872–874.

Moldoveanu et al., "Undershooting Using the Vertical Hydrophone Array –The South March Island Experiment", SEG International Association 63rd Annual Meeting, Sep. 1993.

Barr et al, 59th Ann Sec Explor Gegrbys. Int. Mtg., vol. 1, pp. 653–656, Oct. 29, 1989; abst. only herewith.

Dragoset et al., 64th Ann. SEG Int. Mtg. pp. 857–860, Oct. 23, 1994; abst. only herewith.

Moldoveanu et al, 65th Ann. SEG Int. Mtg. Oct. 8, 1995, pp. 999–1002 (Pap. No. SA 3–5); abst. only herewith.

*Primary Examiner*—Nelson Moskowitz
*Attorney, Agent, or Firm*—Fish & Richardson P.C.

[57] ABSTRACT

A method is described that attenuates reverberations in ocean bottom cable data used to generate a seismic profile. First, a seismic wave is generated and recorded by pressure and particle velocity sensor pairs. Adding the product of the pressure data times the absolute value of the velocity data and the product of the velocity data times the absolute value of the pressure data eliminates reverberations, leaving a combined signal that is a function of only the primary wave response signal. Dividing this combined signal by the number 2 and a sensitivity scaling factor, and then taking the square root of the result produces the magnitude of the primary signal. Replacing the positive/negative sign of the combined signal that existed before taking the absolute value provides the proper polarity. The data are then incorporated into a seismic profile.

13 Claims, 7 Drawing Sheets

5,621,700

METHOD FOR ATTENUATION OF REVERBERATIONS USING A PRESSURE-VELOCITY BOTTOM CABLE

FIELD OF THE INVENTION

The invention relates to seismic profiling of formations located under bodies of water using pressure-velocity bottom cables.

BACKGROUND OF THE INVENTION

Marine seismic exploration is an extremely important tool for location of off-shore reserves. One known procedure for marine seismic exploration involves use of an ocean bottom cable as illustrated in prior art FIG. 1. Surveys using ocean bottom cables are typically employed in areas populated with numerous obstacles, such as drilling and production platforms. In this technique, several miles of bottom cables 11 (only one shown in the FIG. 1) are deployed along the sea floor 13 by vessel 15. Usually, multiple cables 11 are deployed in parallel, as shown in FIG. 2. The bottom cable 11 is provided with a plurality of sensor pairs 17 placed at regular intervals along the cable, each sensor pair 17 containing a pressure sensor (e.g., hydrophone) and particle velocity sensor (e.g., geophone). Acoustic energy is generated in the vicinity of the cable using an air gun array or a marine vibrator array 19. The source wavelet travels downward through the earth and is partially reflected by subsurface layers (formation 21 in FIG. 1) that present an acoustic impedance contrast. The primary reflected wavelet 23 travels upwardly from the subsurface layer, and the pressure waves generated by the upward-traveling reflection are detected by the sensor pairs 17.

Seismic exploration using ocean bottom cables is complicated by secondary waves such as wave 25, known as "ghosts," that are received by the sensors pairs 17 as downward-traveling reflections after reflecting off the air/water boundary at the surface 29. The air/water boundary is an efficient reflector, and thus the ghosts are significant in amplitude and are difficult to differentiate from the primary waves. These ghosts adversely affect the data obtained during the exploration by attenuating certain frequencies. In addition, when the water depth is large, the spectral ghost notches fall in the seismic frequency band and drastically affect the seismic resolution. Resolution is further complicated by multiple reflection waves and water layer reverberations such as wave 27.

The purpose of using both hydrophones and geophones in the ocean bottom cable is to capitalize on the differences between these two types of sensors to attenuate the downgoing waves which include the ghosts and the water layer reverberations. Their responses to the primary reflections are in phase, but are 180° out of phase to the ghosts and to the reverberations.

FIG. 3a illustrates amplitude versus time hydrophone response at the water bottom. For the hydrophone, at time $t_1$ (the primary wave), the hydrophone response is defined as T. At time $t_2$ (the first water layer reverberation), the hydrophone response is $-(1+r)T$; at time $t_3$ (the second reverberation) it is $r(1+r)T$; and at time $t_4$ (the third reverberation), it is $-r^2(1+r)T$, where r is between 0 and 1 and is the water bottom reflectivity at each receiver position. Additional reverberations continue to decrease in amplitude.

The geophone amplitude versus time response is shown in FIG. 3b. The amplitude at $t_1$ is MT, where M is a sensitivity scaling factor that depends upon the particular type of sensors used. At time $t_2$, the geophone response is $(1-r)MT$. At time $t_3$, the response is $-r(1-r)MT$, and at time $t_4$ is $r^2(1-r)MT$.

It is apparent from FIGS. 3a and 3b that while the primary geophone and hydrophone responses are in phase, the responses to the water layer reverberations are 180° out of phase. Thus, the attenuation of the reverberations can be achieved by adding the hydrophone and the geophone signals together after the signals have been suitably scaled. Theoretically, the scale factor $S=(1+r)/(1-r)$, where r is the water bottom reflectivity, should be applied to the geophone data. Determination of the water bottom reflectivity coefficient r depends upon the acoustic impedance of the bottom material. Thus, the scale factor S can vary among different sensor pair locations on the same cable.

There are several known methods for deriving the scaling factors for geophone signals. U.S. Pat. No. 5,235,554 describes a method where a calibration survey is used to estimate the water bottom reflection coefficient. In such a calibration survey, a low energy source is fired over each sensor pairs and the scale is determined from the ratio of the peaks of the first arrivals of the hydrophone and geophone signals. Collection of this survey data requires additional time and cost over and above the data acquisition phase of the survey. U.S. Pat. No. 5,396,472 describes a method to derive the water bottom reflection coefficient that eliminates the need for a separate calibration survey, but involves complex mathematics including summing the pressure and velocity signals, multiplying the results by the inverse Bachus operator, and then solving for the water bottom reflectivity r using an optimization algorithm. U.S. Pat. No. 5,365,492 describes a method wherein the hydrophone signal is used first to adaptively remove noise from the geophone signal, and then the cleaned geophone signals are scaled by a scaling factor and added to the hydrophone signals. The resulting signal is then auto-correlated and the relative amplitude of the first auto-correlation's function-side lobe is measured. The optimum scale factor for the geophone data is then found by optimizing the value of the scale factor with respect to the first side-lobe amplitude of the auto-correlation.

SUMMARY OF THE INVENTION

In one aspect, the invention relates to a method of generating a seismic profile using an ocean bottom cable having at least one sensor pair comprising a pressure sensor and a velocity sensor, comprising generating a seismic wave for reflection from earth strata; collecting pressure data with the pressure sensor and velocity data with the velocity sensor; multiplying the pressure data with the absolute value of the velocity data to produce a first result; multiplying the velocity data with the absolute value of the pressure data to produce a second result; summing the first result and the second result to create a third result; dividing the third result by a factor of 2 to obtain a fourth result; dividing the fourth result by a sensitivity scaling factor; recording a positive/negative sign for the fourth result; taking the square root of the absolute value of the fourth result to produce a fifth result; replacing the positive/negative sign of the fourth result into the fifth result to produce a sixth result; and incorporating the sixth result into the seismic profile.

In another aspect, the invention relates to a method of generating a seismic profile using an ocean bottom cable having a first sensor pair and a second sensor pair, each of the first sensor pair and the second sensor pair comprising a pressure sensor and a velocity sensor, comprising generating a seismic wave for reflection from earth strata; collecting pressure data with the pressure sensors and velocity data with the velocity sensors; multiplying the pressure data from the first sensor pair with the absolute value of the velocity data from the first sensor pair to produce a first result; multiplying the velocity data from the first sensor pair with the absolute value of the pressure data from the first sensor pair to produce a second result; summing the first result and the second result to create a third result; dividing the third result by a factor of 2 to obtain a fourth result; dividing the fourth result by a sensitivity scaling factor; recording a positive/negative sign for the fourth result; taking the square root of the absolute value of the fourth result to produce a fifth result; replacing the positive/negative sign of the fourth result into the fifth result to produce a sixth result; multiplying the pressure data from the second sensor pair with the absolute value of the velocity data from the second sensor pair to produce a seventh result; multiplying the velocity data from the second sensor pair with the absolute value of the pressure data from the second sensor pair to produce an eighth result; summing the seventh result and the eighth result to create a ninth result; dividing the ninth result by a factor of 2 to obtain a tenth result; dividing the tenth result by a sensitivity scaling factor; recording a positive/negative sign for the tenth result; taking the square root of the absolute value of the tenth result to produce a eleventh result; replacing the positive/negative sign of the tenth result into the eleventh result to produce a twelfth result; and incorporating the sixth result and the twelfth result into the seismic profile.

In another aspect, the invention relates to a method of attenuating reverberations in seismic data, the seismic data including pressure data and velocity data containing reverberations, comprising reading the pressure data from at least one pressure sensor; reading the velocity data from at least one velocity sensor; and processing the pressure data and the velocity data to produce composite data wherein the reverberations have been attenuated, comprising the steps of: multiplying the pressure data with the absolute value of the velocity data to produce a first result; multiplying the velocity data with the absolute value of the pressure data to produce a second result; summing the first result and the second result to create a third result; dividing the third result by a factor of 2 to obtain a fourth result; dividing the fourth result by a sensitivity scaling factor; recording a positive/negative sign for the fourth result; taking the square root of the absolute value of the fourth result to produce a fifth result; and replacing the positive/negative sign of the fourth result into the fifth result to produce said composite data.

DESCRIPTION OF THE PREFERRED EMBODIMENTS

Preferred embodiments of the invention will now be described with reference to the accompanying Figures.

Figure 1:
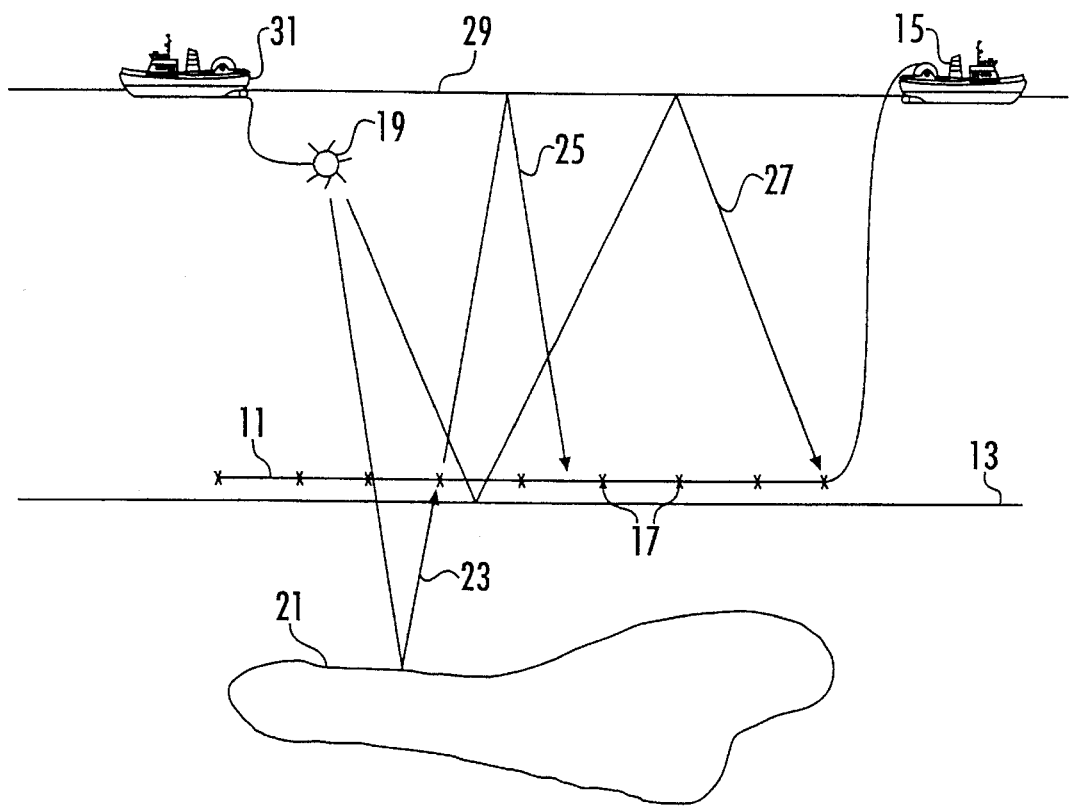
FIG. 1 is an illustration of a conventional ocean bottom cable technique.
Figure 2:
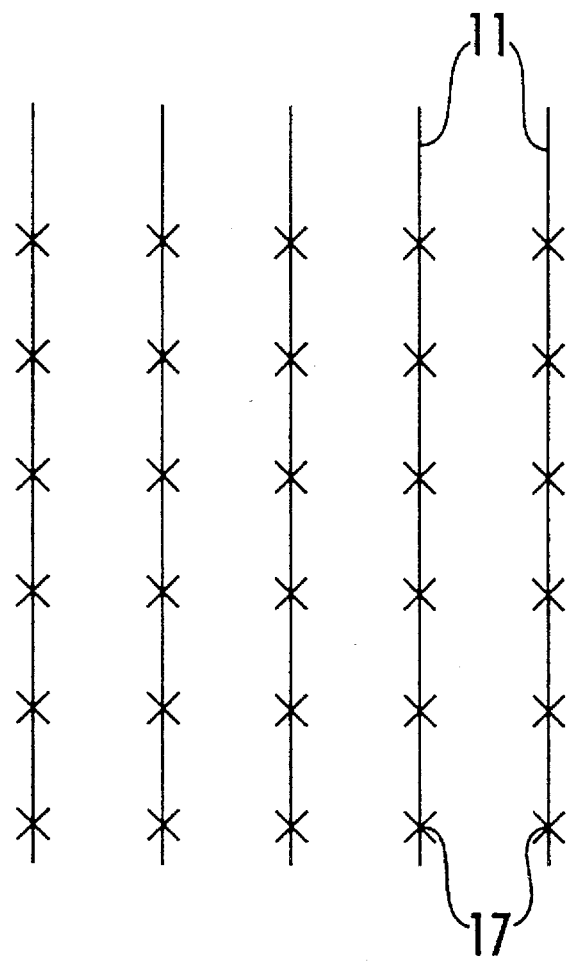
FIG. 2 is an illustration of an array of ocean bottom cables parallel to each other.
Figure 3A:
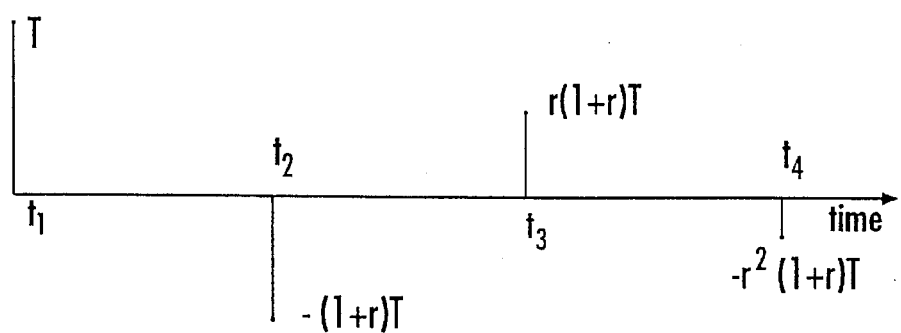
FIGS. 3a and 3b are graphs illustrating hydrophone and geophone response at the water bottom.
Figure 3B:
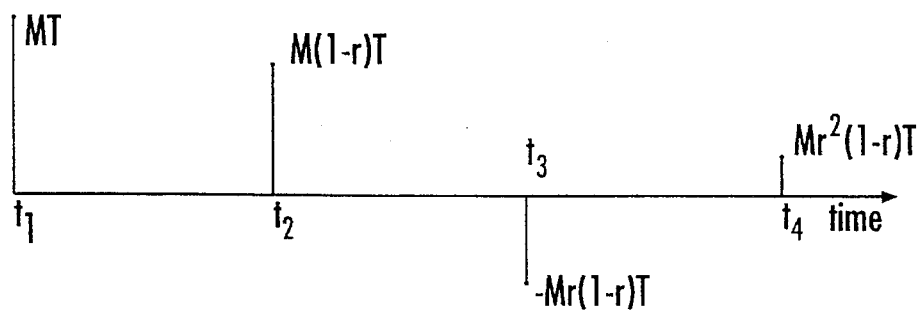

The invention allows unwanted reverberations in ocean bottom cable (OBC) data to be attenuated without the need for determining water bottom reflectivity and without requiring complex mathematical operations. Data may be collected by any known method including, e.g., the method shown in prior art FIGS. 1 and 2.

Figure 4:
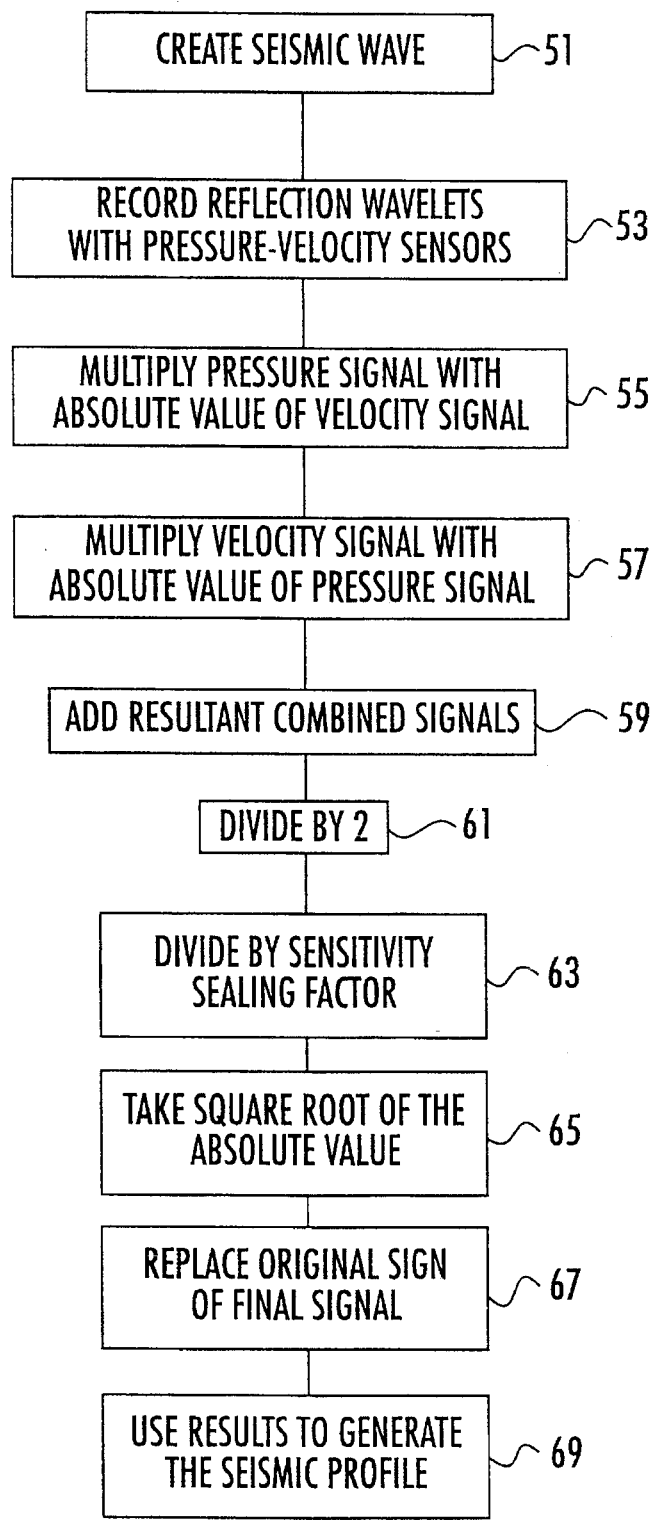
FIG. 4 is a flow chart illustrating a method in accordance with an embodiment of the invention.
Figure 5A:
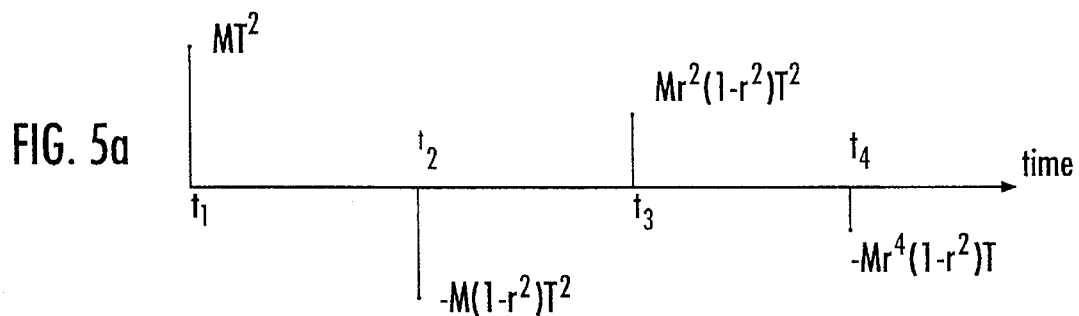
FIGS. 5a–5c are graphs illustrating results obtained from the responses shown in FIGS. 3a and 3b using a method in accordance with the invention.

FIG. 4 is a flow chart of the steps employed to attenuate these reverberations in accordance with an embodiment of the invention. First, a seismic wave (51) is created and data are recorded with pressure and particle velocity sensors (53). Once the data are collected, the pressure response signal is multiplied by the absolute value of the velocity signal (55) at each time t, producing a result as shown in FIG. 5a. The combined primary wave response signal at time $t_1$ now has an amplitude of $MT^2$; at $t_2$, the amplitude of the signal is $-M(1-r^2)T^2$; at $t_3$, the amplitude of the signal is $Mr^2(1-r^2)T^2$; and finally, at $t_4$, the amplitude is equal to $-Mr^4(1-r^2)T^2$ (additional reverberations are not shown).

Figure 5B:
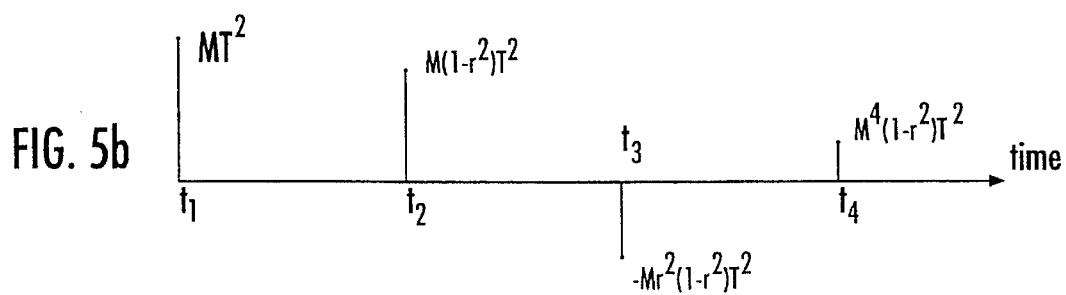

Similarly, the response signal from the velocity sensor is multiplied by the absolute value of the pressure signal (57) at each value of time t. FIG. 5b shows the result of this operation. Combined primary wave response signal at time $t_1$ has an amplitude of $MT^2$, identical to the amplitude of the primary wave response signal in FIG. 5a. At time $t_2$, the amplitude of the combined response signal for the first reverberation is equal to $M(1-r^2)T^2$; at $t_3$, the amplitude of the combined response signal is now $-Mr^2(1-r^2)T^2$; at $t_4$, the amplitude is $Mr^4(1-r^2)T^2$.

Figure 5C:

As can be seen from FIGS. 5a and 5b, the multiplication process has made all of the reverberations have identical amplitudes, but opposite polarities as shown by their positive/negative signs. Adding these signals at each time interval (59) produces a graph with only one response signal located at $t_1$ with a magnitude of $2MT^2$. This result is shown in FIG. 5c. This resultant signal is a function of the primary signal alone; all reverberations have been cancelled out by their respective counterparts. This signal is then divided by two (61) and by the sensitivity scaling factor M (63). The sensitivity scaling factor M is dependent only on the type of sensors used in the bottom cable and this is specified by the manufacturer of the ocean bottom cable. Taking the square root of the absolute value of this last result (65) produces the true amplitude of the primary signal. Replacing the sign that existed before taking the absolute value in the previous step (67) provides the proper polarity for the signal. This result is then incorporated into a seismic profile (69).

Figure 6:
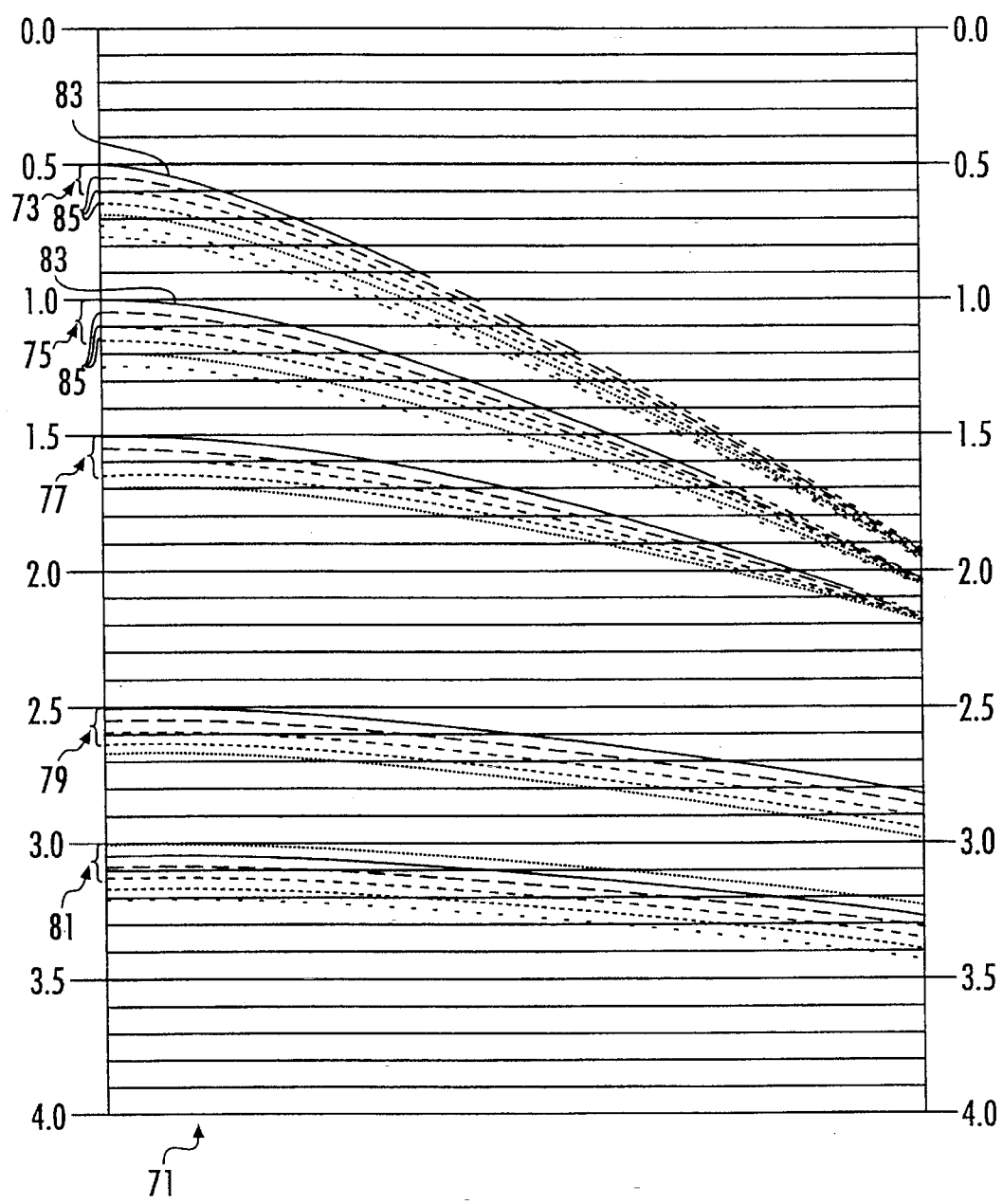
FIG. 6 is a graph of hydrophone-geophone primary reflection data with reverberations.

FIG. 6 illustrates synthetic OBC data containing six clusters of data (73, 75, 77, 79, and 81). Each cluster includes one or more primary reflections 83 and a plurality of reverberations 85. It is clear from the data shown in FIG. 6 that the reverberations 85 are significant in amplitude and will seriously distort any seismic profile produced using this data if they are not successfully attenuated.

Figure 7:
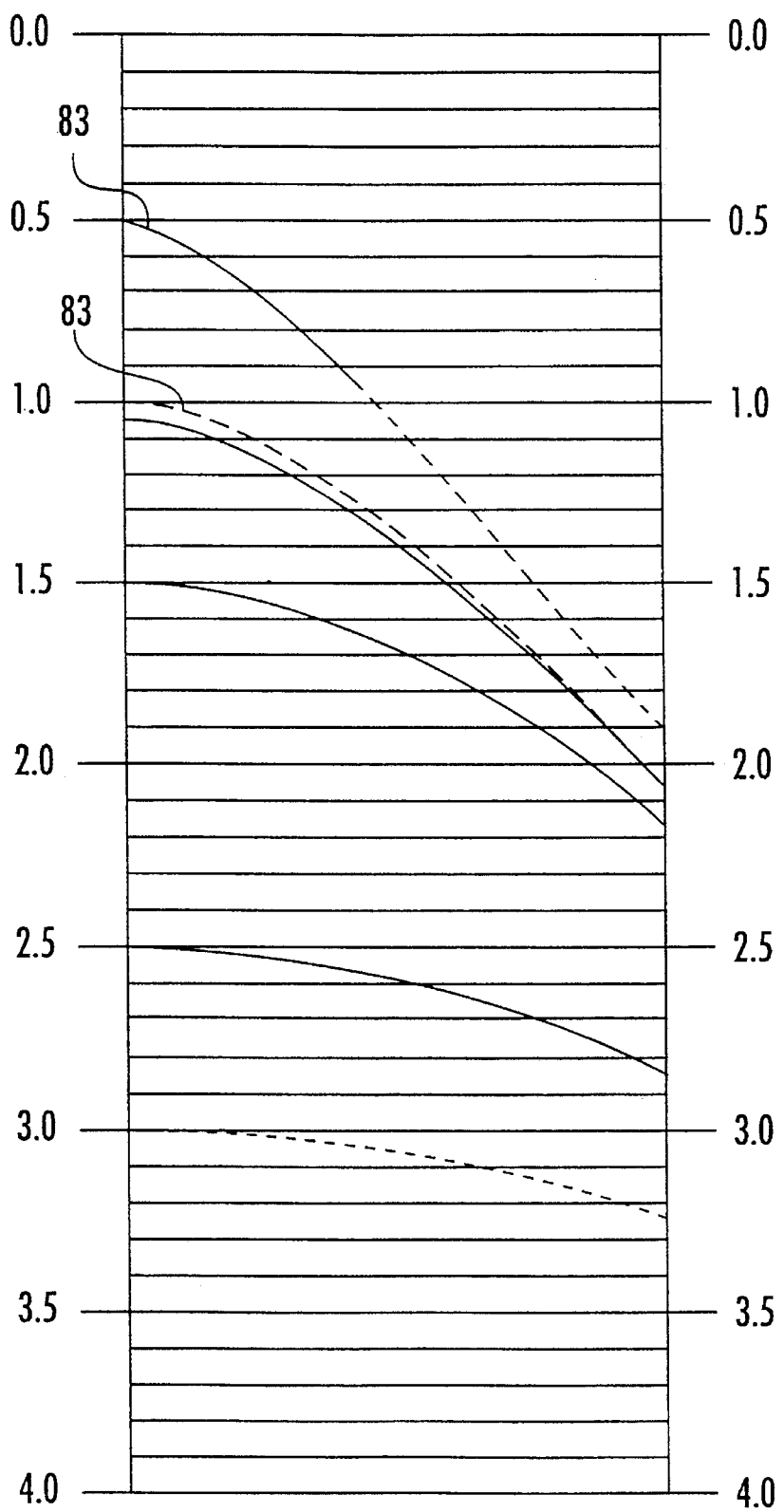
FIG. 7 is a graph of the data of FIG. 6 after application of a method in accordance with the invention.

FIG. 7 illustrates the data of FIG. 6 after application of the method described above and illustrated in FIG. 4. As is clearly shown, only the primary waves 83 are remaining in the data of FIG. 7. Thus, much higher resolution can be achieved in the seismic profile, without necessitating expensive operations to determine a scaling factor for each receiver position in the survey. Once this data is produced with the reverberations attenuated, the processing of the seismic data is straightforward. The processing sequence by which such data as the data shown in FIG. 7 are converted in a final seismic profile that can be geologically interpretated is well known in the art and thus will not be described in detail herein. For instance, this can include deconvolution, static corrections, velocity determination, normal moveout corrections, dip moveout corrections, stack and migration. Detailed description of seismic data processing can be found in any of numerous texts on the subject, including for instance, "Seismic data processing" by Oz Yilmax (Society of Exploration Geophysicists, Tulsa, Okla., 1987).

Various embodiments of the invention have been shown and described. However, the invention is not so limited, but rather is limited only the scope of the amended claims.

What is claimed is:

1. A method of generating a seismic profile using an ocean bottom cable having at least one sensor pair comprising a pressure sensor and a velocity sensor, comprising:

generating a seismic wave for reflection from earth strata;

collecting pressure data with the pressure sensor and velocity data with the velocity sensor;

multiplying the pressure data with the absolute value of the velocity data to produce a first result;

multiplying the velocity data with the absolute value of the pressure data to produce a second result;

summing the first result and the second result to create a third result;

dividing the third result by a factor of 2 to obtain a fourth result;

dividing the fourth result by a sensitivity scaling factor;

recording a positive/negative sign for the fourth result;

taking the square root of the absolute value of the fourth result to produce a fifth result;

replacing the positive/negative sign of the fourth result into the fifth result to produce a sixth result; and incorporating the sixth result into the seismic profile.

2. The method of claim 1, wherein the velocity sensor is a geophone.

3. The method of claim 1, wherein the pressure sensor is a hydrophone.

4. The method of claim 2, wherein the pressure sensor is a hydrophone.

5. A method of generating a seismic profile using an ocean bottom cable having a first sensor pair and a second sensor pair, each of the first sensor pair and the second sensor pair comprising a pressure sensor and a velocity sensor, comprising:

generating a seismic wave for reflection from earth strata;

collecting pressure data with the pressure sensors and velocity data with the velocity sensors;

multiplying the pressure data from the first sensor pair with the absolute value of the velocity data from the first sensor pair to produce a first result;

multiplying the velocity data from the first sensor pair with the absolute value of the pressure data from the first sensor pair to produce a second result;

summing the first result and the second result to create a third result;

dividing the third result by a factor of 2 to obtain a fourth result;

dividing the fourth result by a sensitivity scaling factor;

recording a positive/negative sign for the fourth result;

taking the square root of the absolute value of the fourth result to produce a fifth result;

replacing the positive/negative sign of the fourth result into the fifth result to produce a sixth result;

multiplying the pressure data from the second sensor pair with the absolute value of the velocity data from the second sensor pair to produce a seventh result;

multiplying the velocity data from the second sensor pair with the absolute value of the pressure data from the second sensor pair to produce an eighth result;

summing the seventh result and the eighth result to create a ninth result;

dividing the ninth result by a factor of 2 to obtain a tenth result;

dividing the tenth result by a sensitivity scaling factor;

recording a positive/negative sign for the tenth result;

taking the square root of the absolute value of the tenth result to produce a eleventh result;

replacing the positive/negative sign of the tenth result into the eleventh result to produce a twelfth result; and incorporating the sixth result and the twelfth result into the seismic profile.

6. The method of claim 5, wherein the velocity sensor is a geophone.

7. The method of claim 5, wherein the pressure sensor is a hydrophone.

8. The method of claim 6, wherein the pressure sensor is a hydrophone.

9. The method of claim 5, further using a second ocean bottom cable having a first sensor pair and a second sensor pair, each of the first sensor pair and the second sensor pair comprising a pressure sensor and a velocity sensor.

10. The method of claim 9, wherein the velocity sensor of the second ocean bottom cable is a geophone.

11. The method of claim 9, wherein the pressure sensor of the second ocean bottom cable is a hydrophone.

12. The method of claim 10, wherein the pressure sensor of the second ocean bottom cable is a hydrophone.

13. A method of attenuating reverberations in seismic data, the seismic data including pressure data and velocity data containing reverberations, comprising:

reading the pressure data from at least one pressure sensor;

reading the velocity data from at least one velocity sensor;

processing the pressure data and the velocity data to produce composite data wherein the reverberations have been reduced, comprising the steps of:

multiplying the pressure data with the absolute value of the velocity data to produce a first result;

multiplying the velocity data with the absolute value of the pressure data to produce a second result;

summing the first result and the second result to create a third result;

dividing the third result by a factor of 2 to obtain a fourth result;

dividing the fourth result by a sensitivity scaling factor;

recording a positive/negative sign for the fourth result;

taking the square root of the absolute value of the fourth result to produce a fifth result; and replacing the positive/negative sign of the fourth result into the fifth result to produce a sixth result.

* * * * *